(12) United States Patent
Yamanaka (10) Patent No.: US 8,355,071 B2
(45) Date of Patent: Jan. 15, 2013

(54) OPTICAL SYSTEM (75) Inventor: Tomoaki Yamanaka, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 91 days.

(21) Appl. No.: 12/903,982

(22) Filed: Oct. 13, 2010

(65) Prior Publication Data
US 2011/0115968 A1 May 19, 2011

(30) Foreign Application Priority Data
Nov. 16, 2009 (JP) ................................. 2009-261130

(51) Int. Cl.
H04N 5/232 (2006.01)
G02B 7/09 (2006.01)
(52) U.S. Cl. ........... 348/335; 348/372; 359/694; 396/85
(58) Field of Classification Search .................. None
See application file for complete search history.

(56) References Cited

U.S. PATENT DOCUMENTS

| 5,930,054 A * | 7/1999 | Kasuya ........................... 359/698 |
| 6,954,313 B2 | 10/2005 | Kaneda et al. |
| 7,013,082 B2 | 3/2006 | Kaneda et al. |
| 7,693,409 B2 * | 4/2010 | Morimoto ........................ 396/85 |
| 2003/0128288 A1 * | 7/2003 | Kawamura et al. ............ 348/335 |
| 2004/0114251 A1 * | 6/2004 | Kaneda et al. ................. 359/694 |
| 2005/0219710 A1 * | 10/2005 | Hirai .............................. 359/689 |

FOREIGN PATENT DOCUMENTS

| JP | 2004-233892 A | 8/2004 |
| JP | 2006-258586 A | 9/2006 |

* cited by examiner

Primary Examiner — Chieh M Fan
Assistant Examiner — Dwight C Tejano
(74) Attorney, Agent, or Firm — Canon U.S.A., Inc. IP Division (57) ABSTRACT An optical system of the present invention includes a storage unit which stores an operated position of an operation unit and a position of an optical member. When the power supply to the optical system terminates and then restarts, a control unit compares the stored operated position and the operated position detected by a first sensing unit upon restart. If they are different, the control unit controls a driving unit such that the position of the optical member detected by a second sensing unit can be a target position. If they are the same, the control unit controls the driving unit such that the position of the optical member detected by the second sensing unit can be the stored position of the optical member.

7 Claims, 9 Drawing Sheets

OPTICAL SYSTEM

BACKGROUND OF THE INVENTION

1. Field of the Invention

The present invention relates to an optical system that controls the driving of an optical member on the basis of an operation on an operation unit.

2. Description of the Related Art

An optical system such as an imaging apparatus, a lens apparatus, and binoculars may have the known configuration in which an operation unit is operated to move an optical member such as a lens in accordance with the operated position (amount of operation) of the operation unit.

Japanese Patent Application Laid-Open No. 2006-258586 discloses an imaging apparatus in which a zoom ring is rotated to move a variable-power lens, which is mechanically connected thereto, through an interlock.

Japanese Patent Application Laid-Open No. 2004-233892 discloses an imaging apparatus in which a zoom ring is rotated to drive a zooming motor on the basis of the rotational position of a zoom ring detected by a rotational absolute position encoder and small-angle-displacement detected pulse encoder, which thus moves a variable-power lens. The variable-power lens is controlled so as to move to a target position on the basis of its position detected by the zoom encoder.

The configuration in which an operation unit such as a zoom ring is operated to move an optical member may require one-to-one correspondence between an operated position of the operation unit and the position of the optical member for higher operability for the operator.

In the configuration disclosed in Japanese Patent Application Laid-Open No. 2006-258586, a zoom ring and a variable-power lens are mechanically connected. Thus, whether the imaging apparatus is powered on or off, the operation on the zoom ring moves the variable-power lens, thus typically keeping the one-to-one correspondence between an operated position of the operation unit and the position of the optical member. However, the mechanical connection between the operation unit and the optical member may increase the complexity and the size of the device.

In the configuration disclosed in Japanese Patent Application Laid-Open No. 2004-233892, on the other hand, if the zoom ring is moved when the imaging apparatus is powered off, the one-to-one correspondence between the operated position of the operation unit and the position of the optical member is not satisfied.

If the zoom ring is not moved when the imaging apparatus is powered off, the operator may sometimes intend to photograph with the same zoom ratio as that before the power supply terminates (i.e., before the apparatus is powered off).

However, even if the zoom ring is not moved when the imaging apparatus is powered off, the lens may be moved to a position displaced from the position of the variable-power lens before it is powered off as a result of the control over the position of the variable-power lens based on the position of the zoom ring. This is because the zoom ring is recognized as being at a different rotational position from the position before the it is powered off even though the zoom ring stays at the same position due to a sensing error by an encoder that detects rotation of the zoom ring and/or a difference in resolution from the encoder that detects the lens position. As a result, though the operation unit is not moved, the zoom ratio differs between before it is powered off and after it is powered on again, which may reduce accuracy in the operability of the lens. These problems may occur similarly not only in the zoom ring but also in other operation units such as a focus ring.

SUMMARY OF THE INVENTION

The present invention provides an optical system including an operation unit which upon being operated changes the position of an optical member, a first sensing unit which detects the operated position of the operation unit, a second sensing unit which detects the position of the optical member, a control unit which calculates a target position of the optical member on the basis of the operated position detected by the first sensing unit and controls a driving unit which drives the optical member such that the position of the optical member detected by the second sensing unit can be the target position, and a storage unit which stores the operated position and the position of the optical member, wherein when power supply to the optical system terminates and then the power supply restarts, the control unit compares the stored operated position and the operated position detected by the first sensing unit upon restart, if the stored operated position and the detected operated position are different, the driving unit is controlled such that the position of the optical member detected by the second sensing unit can be the target position, and if the stored operated position and the detected operated position are the same, the driving unit is controlled such that the position of the optical member detected by the second sensing unit can be the stored position of the optical member.

The present invention provides an optical system which has a camera body and a lens apparatus which contains an optical member and removably attached to the camera body, the system including an operation unit which operates the position of an optical member, a first sensing unit which detects the operated position of the operation unit, a driving unit which drives the optical member, a second sensing unit which detects the position of the optical member, a control unit which calculates a target position of the optical member on the basis of the operated position detected by the first sensing unit and controls the driving unit such that the position of the optical member detected by the second sensing unit can be the target position, a storage unit which stores the operated position and the position of the optical member, and a communication unit that communicates information on the termination of power supply to the lens apparatus and information on the operated position immediately before the power supply to the lens apparatus terminates and the position of the optical member between the camera body and the lens apparatus, wherein when power supply to the lens apparatus terminates and then the power supply restarts, the control unit compares the stored operated position and the operated position detected by the first sensing unit upon restart, and if the stored operated position and the detected operated position are different, the driving unit is controlled such that the position of the optical member detected by the second sensing unit can be the target position, and if the stored operated position and the detected operated position are the same, the driving unit is controlled such that the position of the optical member detected by the second sensing unit can be the stored position of the optical member.

Further features of the present invention will become apparent to persons having ordinary skill in the art from the following description of exemplary embodiments with reference to the attached drawings.

DESCRIPTION OF THE EMBODIMENTS

The embodiments of the present invention will be described in detail below with reference to drawings.

First Embodiment

Figure 1:
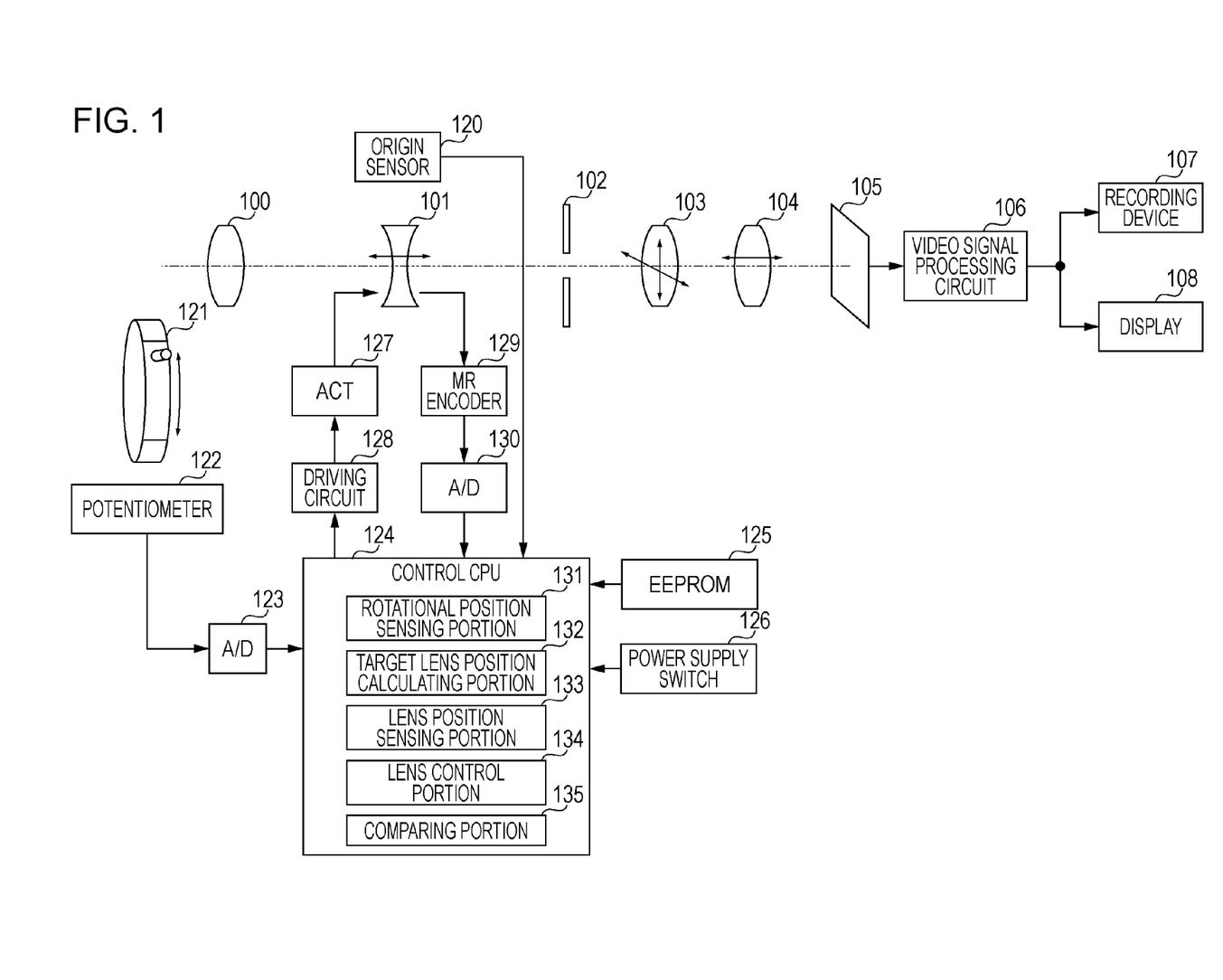
FIG. 1 is a block diagram illustrating an imaging apparatus according to a first embodiment.

FIG. 1 is a block diagram illustrating an imaging apparatus that is an example of an optical system according to a first embodiment of the present invention. According to this embodiment, a zoom lens unit is to be operated by an operation unit, such as a zoom ring.

FIG. 1 includes a fixed front lens unit 100, a zoom lens unit 101 which moves in the direction of an optical axis to scale, a shift lens unit 103 which is driven in the pitch direction (longitudinal direction) and yaw direction (horizontal direction) about the optical axis for deflection correction, and a focus lens unit 104 which moves in the direction of optical axis for focusing. FIG. 1 further includes a diaphragm unit 102 which is configured to adjust the quantity of light passing therethrough.

A luminous flux from a subject, not shown, passes through the lens units 100, 101, 103, and 104 and diaphragm 102 and forms an image on a light receiving surface of an imaging element (photoelectric conversion element) 105 such as a CCD sensor and a CMOS sensor. In the imaging element 105, charges having undergone photoelectric conversion are stored, and charges are read therefrom by a video signal processing circuit 106 at a predetermined time. The video signal processing circuit 106 has an AD conversion function which converts an analog signal from the imaging element 105 to a digital signal. The video signal processing circuit 106 performs processing such as predetermined amplification and gamma correction on an output signal from the imaging element 105 to generate a video signal. The video signal may be output to a display 108 such as a liquid crystal display panel and/or a recording device 107 such as a tape, a magnetic or optical disk, and a flash memory or the like.

A zoom control ring 121 is a ring-shaped operation unit and when operated upon performs a scaling operation in a tele direction and a wide direction. It may by stated, therefore, that the zoom control ring 121 acts as an operation unit which when operated upon moves an optical member such as a zoom lens in proportion to an operation amount (operated position) of the operation unit. In other words, the operation unit operates the position of an optical member. The zoom control ring 121 has a mechanical operation end that limits a range of the operation amount or corresponding operated position thereof.

The rotational position (operated position) information on the zoom control ring 121 is detected by a potentiometer 122. The rotational positional information detected by the potentiometer 122 is an absolute position. An AD converter 123 converts an analog signal of a rotational position of the control ring detected by the potentiometer 122 to a digital signal.

A control CPU 124 controls detection of a rotational position from the operation unit and driving of the lens units. The rotational positional information on the zoom control ring 121 is digitized by the AD converter 123 and is calculated as a rotational position by a rotational position computing portion 131 within the control CPU. In other words, a first sensing unit according to the present invention corresponds to the potentiometer 123 and rotational position computing portion 131 according to this embodiment. In the rotational position computing portion 131, noise removal and standardization may be performed on the AD-converted rotational positional information for easy digital computing. At a normal operation state, the target position to which the zoom lens unit 101 is to be driven by a target lens position computing portion 132 is calculated on the basis of the computing result by the rotational position computing portion 131.

The detection resolution for the rotational position (absolute position) of the zoom control ring 121 as a result of AD-conversion of the output of the potentiometer 123 is relatively low. Thus, when the rotational position is directly handled as a target lens position, smooth zooming operations are difficult to perform. Accordingly, the target lens position calculating portion 132 has a function of using the amount of change (rotational speed) between the rotational positions for a predetermined period of time, for example, to interpolate the rotational positions and determining the target lens position on the basis of the interpolation result. This allows the zoom lens unit 101 to implement more accurate position control than the zoom control ring 121. Thus, smooth operability can be obtained.

The positional information on the zoom lens unit 101 is detected by a magnetic resistance element (MR) encoder 129 that is a sensing unit which detects a relative position. Since the output of the MR encoder 129 is an analog signal, it is converted to a digital signal by the AD converter 130. The lens position computing portion 133 within the control CPU 124 performs noise removal and/or standardization on the digitized position signal and calculates the lens position. A position sensor such as an MR encoder to be used for detecting a lens position is a relative position sensor which normally outputs a signal periodically. Since the absolute position of the lens is not clear from the relative position, driving control is difficult to perform. An origin sensor 120 may be a photo-interrupter or mechanical switch and detects a reference position being a reference for detecting a lens position. On the basis of the reference position detected by the origin sensor 120, the lens position computing portion 133 converts the relative position acquired by the MR encoder 129 to the absolute position of the lens.

The origin sensor will be described in more detail. The origin sensor 120 is attached to a fixing member, not shown. When the zoom lens unit 101 is driven in the direction of an optical axis by an actuator 127 and reaches the detection area of the origin sensor 120, the output of the origin sensor 120 changes (for example, from High to Low or from Low to High). When the output of the origin sensor 120 changes, the origin sensor detects the lens position acquired by the MR encoder 129. The lens position is information indicating the reference position. From the relative position relationship between the reference position and a real lens position acquired by the MR encoder 129, the absolute position of the zoom lens unit 101 can be acquired. In other words, a second sensing unit according to the present invention corresponds to the MR encoder 129, origin sensor 120 and lens position computing portion 133 according to this embodiment. Without using the origin sensor, it may be abutted against the driving end of the zoom lens unit, and the absolute position may be acquired by handling the position of the driving end as its reference position. According to this embodiment, the detection resolution of the MR encoder 129 is higher than the detection resolution of the potentiometer 122. Thus, the detection resolution of the second sensing unit is higher than the detection resolution of the first sensing unit.

The lens control portion 134 compares the target position calculated by the target lens position computing portion 132 and the present lens position acquired by the lens position computing portion 133 and outputs a drive control signal to the driving circuit 128 such that the lens position can reach the target position. In the driving circuit 128, the acquired drive control signal is converted to a drive signal for moving the actuator 127. The actuator 127 being a driving unit is driven by the drive signal and drives the zoom lens unit 101 to a predetermined target position. Repeating the series of operations allows the zoom lens unit 103 to be driven in a one-to-one manner in accordance with the operations of the zoom control ring 121 when the power supply is on.

An EEPROM 125 is a storage unit which stores a rotational position detected by the rotational position computing portion 131 and a lens position detected by the lens position computing portion 133. The EEPROM 125 is a non-volatile storage unit and may retain the stored data even when the power supply is off. The power supply of the imaging apparatus is turned on and off by a power supply switch 126 which is a switching unit.

A comparing portion 135 compares the rotational position calculated by the rotational position computing portion 131 when the power supply to the imaging apparatus terminates and then the power supply restarts and the rotational position stored in the EEPROM 125. The expression "the power supply terminates" includes not only the case where an operator turns off the power supply switch 126 but also the case where a battery or an AD adapter which supplies power to the imaging apparatus is removed therefrom or the battery in the image apparatus becomes completely discharged. As will be described below, when a lens apparatus and a camera apparatus are provided separately, the case where the lens apparatus is removed from the camera apparatus may also be considered a state where the power supply terminates. On the other hand, the expression "the power supply restarts" includes not only the case where an operator turns on the power supply switch 126 but also the case where a battery or AD adapter which supplies power to the imaging apparatus is attached thereto. As will be described below, when a lens apparatus and a camera apparatus are provided separately, the case where the lens apparatus is attached to the camera apparatus may also be considered a state where the power supply restarts.

The control unit according to the present invention includes at least the target lens position computing portion 132, lens control portion 134, and comparing portion 135. According to this embodiment, the control CPU 124 is an integral unit containing the part corresponding to the control unit and the rotational position computing portion 131 and lens position computing portion 133 corresponding to a part of the first sensing unit and second sensing unit.

Next, control to be performed in the imaging apparatus of this embodiment will be described. In an imaging apparatus according to this embodiment, when the power supply to the imaging apparatus once terminates and then restarts, the lens control portion 134 controls the actuator 127 in accordance with the detection result in the comparing portion 135.

More specifically, if the two rotational positions are different as a result of the comparison in the comparing portion 135, the lens control portion 134 controls the actuator 127 such that the lens position calculated by the lens position computing portion 133 after the power supply restarts can be the target position based on the rotational position calculated by the rotational position computing portion 131 after the power supply restarts. Thus, even if the zoom control ring 121 is moved while the power supply is terminating, the rotational position of the zoom control ring 121 and the position of the zoom lens unit 103 can correspond in a one to one manner while power is being supplied, that is, while photographing is being enabled.

On the other hand, if the two rotational positions are the same, the lens control portion 134 controls the actuator 127 such that the lens position calculated by the lens position computing portion 133 after the power supply restarts can be the lens position stored in the EEPROM 125. This is because the zoom lens unit is moved to a different position from the position before the power supply terminates if the position of the zoom lens unit is controlled on the basis of the rotational position calculated by the rotational position computing portion 131 after the power supply restarts.

Figure 2:
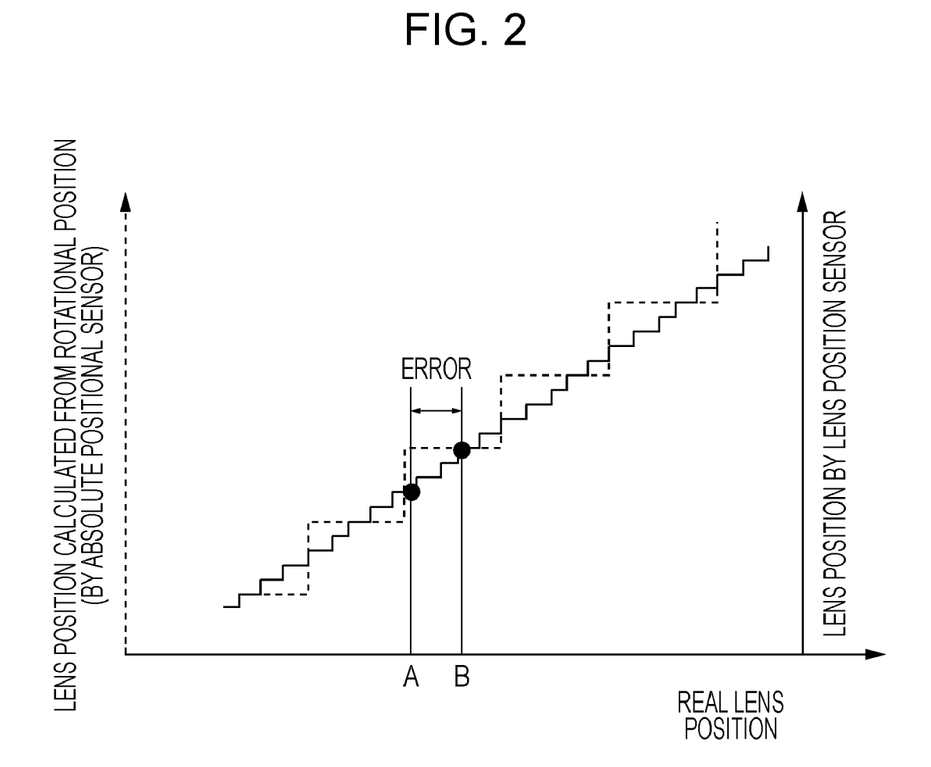
FIG. 2 is a conceptual diagram illustrating the principle of the occurrence of an error of a lens position

FIG. 2 illustrates the principle of occurrence of an error of a lens position when the power supply restarts according to the present invention. The illustrated broken lines indicate the relationship between the lens position acquired from a potentiometer in a control ring and a real lens position, and the solid lines indicate the relationship between a lens position acquired from an MR encoder with reference to the origin and a real lens position. As seen from FIG. 2, when the potentiometer 122 detects that the lens is at a position A, and the MR encoder detects the lens is at position B, there is a detection error. In other words, it is recognized that the zoom control ring 121 is at a different rotational position from that before the power supply is turned off even if the zoom control ring 121 stays at the same rotational position. Since the detection resolution of the MR encoder is higher than the detection resolution of the potentiometer, the zoom lens unit moves so as to move the lens position by the amount of error.

According to this embodiment, the actuator 127 is controlled to the stored lens position such that the zoom control ring 121 returns to the same lens position as before the power supply terminates even if it is displaced from the present lens position once after the power supply restarts for detecting the origin. Thus, the rotational position of the zoom control ring 121 and the position of the zoom lens unit 103 can correspond in a one-to-one manner.

According to the present invention, the expression "the same rotational position" includes not only the case where the detection results are the same because the actual difference in rotational position is equal to or lower than the detection resolution of a sensor but also the case where the detection results are different but the difference is equal to or lower than a predetermined amount that is not intended to operate by an operator. This is because the lens position may move to a different position from that before the power supply terminate if it is determined that the rotational positions are different on the basis of a small difference in rotational position that is not intended by a photographer. In the latter case, the one-to-one relationship is actually not satisfied, but the operability may increase when the same lens position is intended by an operator as before the power supply terminates.

Next, with reference to a flowchart illustrated in FIG. 3, operations upon powered off according to this embodiment will be described. In the flowcharts, a processing step is abbreviated by "S" and followed by a number. However, the number is not necessarily indicative of an order in which these steps may be performed. That is, as long as the process includes the necessary steps, those steps can be performed in any order, unless specifically indicated otherwise.

[Step S201] Whether a user has operated a power supply switch or not is detected. If the power supply is turned off (YES at S201), the processing moves to step S202. If not (NO at S201), the detection is repeated.

[Step S202] A rotational position P1 is detected in order to store the rotational position of the control ring when the power supply is turned off.

[Step S203] The rotational position P1 detected in step S202 is stored in a storage unit such as an EEPROM.

[Step S204] The present lens position L1 is detected in order to store the lens position when the power supply is turned off. The lens position L1 here refers to positional information that is a relative value acquired by a position sensor such as an MR encoder with reference to an origin sensor and converted to an absolute value.

[Step S205] The lens position L1 detected in step S204 is stored in the storage unit such as an EEPROM.

[Step S206] The current feeding to the control CPU and/or driving circuit, for example, is turned off, and the imaging apparatus is powered off.

Figure 4:
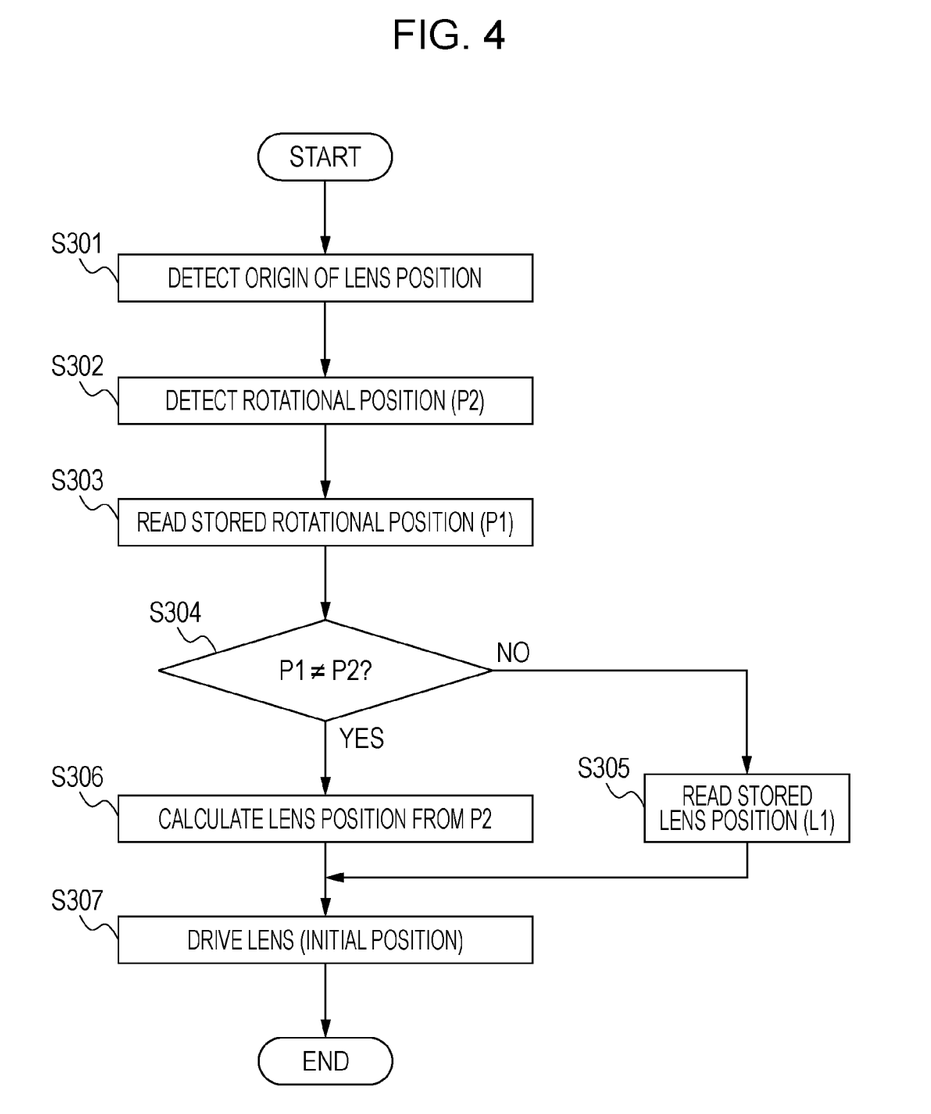
FIG. 4 is an operation flowchart when power supply is turned off according to the first embodiment.

With reference to the flowchart illustrated in FIG. 4, operations to be performed when the power supply restarts according to this embodiment will be described.

[Step S301] The origin of a lens position is detected (reference position is detected). The output of the origin sensor such as a photointerrupter provided in the lens unit is monitored, and subsequent results of detection of the lens position are converted to absolute values with reference to the point of electrical switching between High and Low.

[Step S302] A rotational position P2 of the control ring when the power supply is turned on is detected.

[Step S303] The rotational position P1 stored in the EEPROM when the power supply is turned off is read out.

[Step S304] Whether the rotational position P2 when the power supply is turned on, which is detected in step S302, and the rotational position P1 stored when the power supply is turned off are the same or not is determined. If so (NO at S304), the processing moves to step S305. If not (Yes at S304), the processing moves to step S306. Though this flow determines whether the relationship is P1 ≠ P2 or not for easy description, whether the absolute value of the difference between P1 and P2 is within a predetermined error range or not may also be determined in consideration of noise when the rotational position is detected or time-dependent changes.

[Step S305] If the rotational position P1 and the rotational position P2 exhibit the same value, it may be considered that the control ring has not been moved during the period from the time when the power supply is turned off to the time when it is turned on. In other words, it is optimum to return the lens to the position when the power supply is turned off. Accordingly, the lens position stored when the power supply is turned off is read from the EEPROM.

[Step S306] If the rotational position P1 and the rotational position P2 exhibit different values, it may be considered that the control ring has been moved during the period from the time when the power supply is turned off to the time when it is turned on. If the lens is returned to the lens position stored when the power supply is turned off, the one-to-one relationship between the control ring and the lens position is no longer satisfied. Accordingly, if the rotational positions exhibit different values, the target lens position is calculated from the present rotational position of the control ring.

[Step S307] The lens is driven to the stored lens position read in step S305 or the target lens position calculated from the rotational position in step S306.

As described above, according to this embodiment, a lens can be returned to an optimum initial position when the imaging apparatus is powered on again, and the one-to-one relationship can be kept between the rotational position of the zoom control ring and the position of the zoom lens unit.

Second Embodiment

Figure 5:
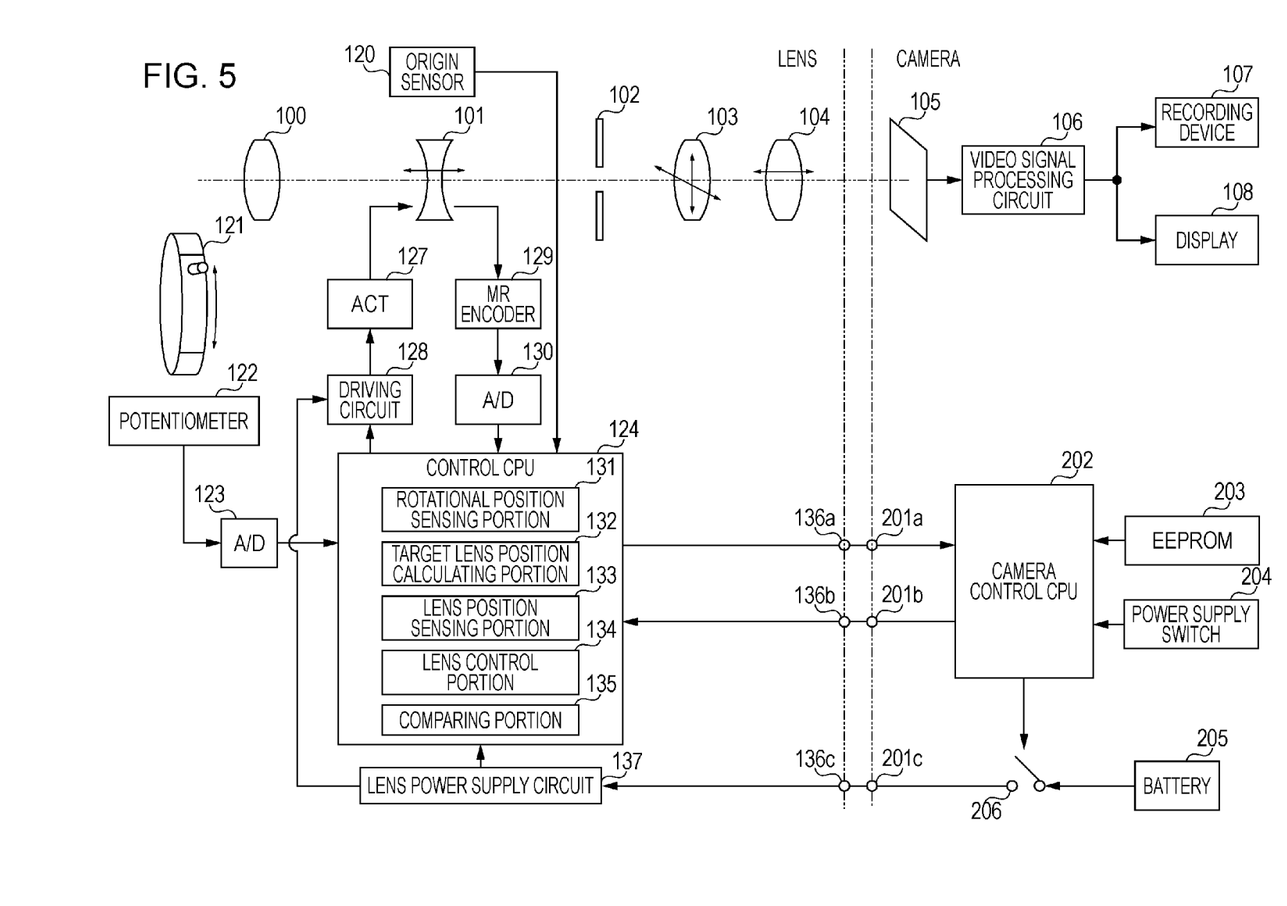
FIG. 5 is a block diagram illustrating an imaging apparatus according to a second embodiment.

FIG. 5 is a block diagram illustrating an imaging system that is an example of an optical system separately having a lens apparatus and a camera apparatus according to a second embodiment of the present invention. The description on the functions and blocks illustrated in FIG. 1 will be omitted.

FIG. 5 illustrates a lens apparatus (interchangeable lens) on the left and a camera apparatus (camera body) on the right of the alternate ling and short dash lines. The lens apparatus internally contains a power supply circuit 137 and receives power supply from a battery 205 in the camera apparatus through connecting terminals 136c and 201c. In the lens power supply circuit 135, power supply voltage is generated for a control CPU, an actuator drive, and a sensor. The power is supplied to the units. A camera control CPU 202 is configured for detection of the switching of a power supply switch 204, access to an EEPROM 203 and communication with a control CPU 124 in the lens apparatus. Whether power is to be supplied from the battery 205 to the lens power supply circuit 135 or not is switched with a power supply switch 206. In the camera control CPU 202, if it is determined that the power supply to the lens power supply circuit is not necessary because it is not at a photographing state, for example, the power supply switch 206 is turned off to prevent unnecessary power consumption. The camera control CPU 202 and control CPU 124 communicate through contacts 201a and 136a and 201b and 136b. In the block diagram in FIG. 5, the EEPROM 203 is provided in the camera apparatus. Since the EEPROM is a non-volatile storage unit, the stored data are not lost normally even when the power supply thereto terminates. However, there is a possibility of data loss in some timing of the termination of power supply. If the EEPROM is provided in the lens apparatus, unexpected removal of the lens apparatus may lose the data therein. However, providing the EEPROM in the camera apparatus can avoid the risk. The EEPROM may be provided in the lens apparatus if there is not the risk.

Figure 6:
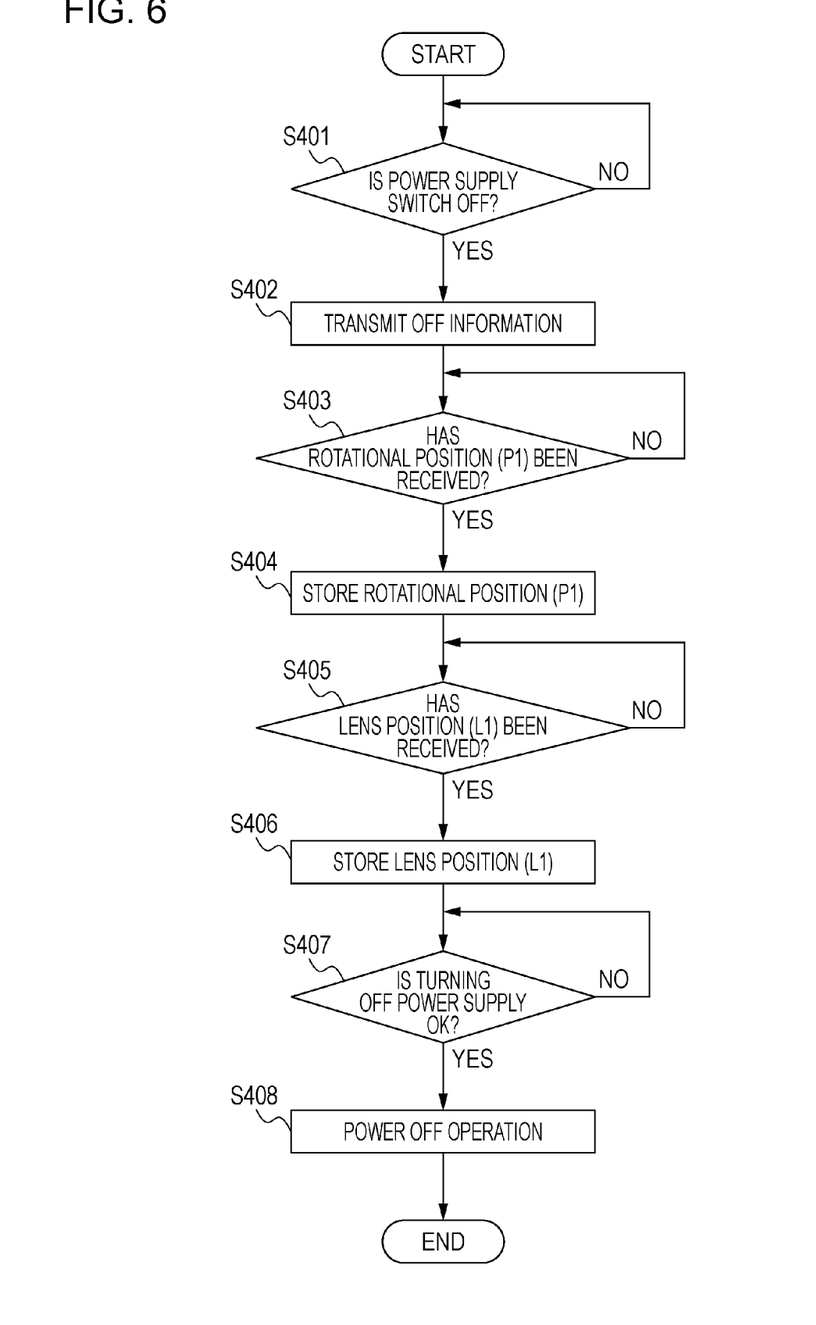
FIG. 6 is an operation flowchart when power supply to a camera apparatus is turned off according to the second embodiment.

Next, with reference to a flowchart illustrated in FIG. 6, operations occurring when the camera apparatus is being powered off according to this embodiment will be described.

[Step S401] Whether a user has operated a power supply switch or not is detected. If the power supply is being turned off (YES at S401), the processing moves to step S402. If not (NO at S401), the detection is repeated.

[Step S402] Power-off information is transmitted to the control CPU 124 in the lens apparatus in order to notify that an operation for powering off has been performed.

Since the lens apparatus does not include a power supply switch, the lens apparatus determines from the power-off information whether the camera apparatus has started the processing for powering off or not.

[Step S403] Rotational position P1 of a zoom control ring 121 is received from the lens apparatus. Whether it has been received or not is determined. If so (YES at S403), the processing moves to the next step. If not (NO at S403), the determination on the reception is repeated.

[Step S404] The rotational position P1 of the zoom control ring 121 transmitted from the lens apparatus is stored in the EEPROM 203.

[Step S405] A lens position L1 of the lens apparatus is received next. Whether it has been received or not is determined. If so (YES at S405), the processing moves to the next step. If not (NO at S405), the determination on the reception is repeated.

[Step S406] Like the rotational position, the received lens position L1 is stored in the EEPROM 203.

[Step S407] Through communication with the lens apparatus, whether the power supply to the lens apparatus may be shut down or not is determined. If so (YES at S407), the processing moves to step S408. If the lens apparatus denies the power shutdown (NO at S407), the processing waits for the completion of the operation for powering off the lens apparatus.

[Step S408] The power supply to the lens apparatus is shut down.

Figure 7:
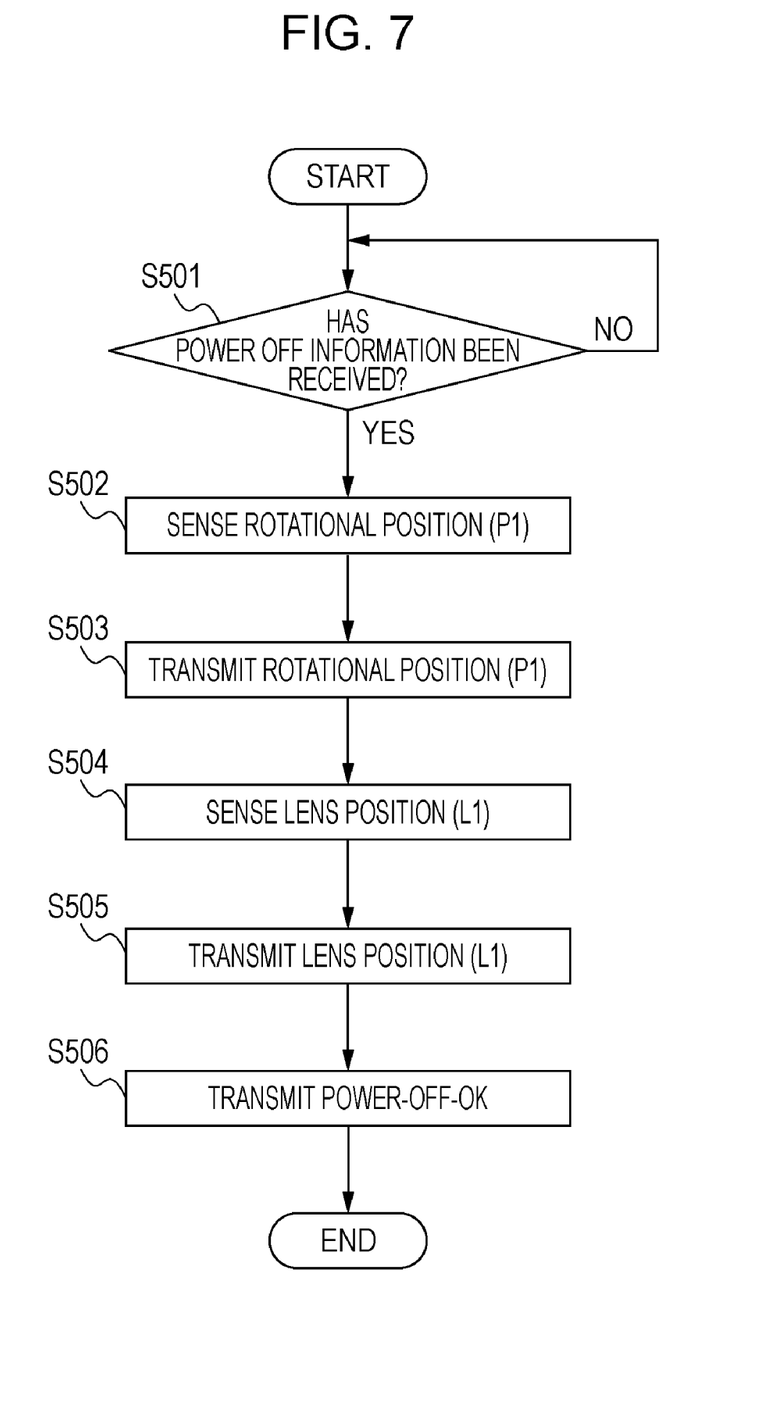
FIG. 7 is an operation flowchart when power supply to a lens apparatus is turned off according to the second embodiment.

Next, with reference to a flowchart illustrated in FIG. 7, operations when the lens apparatus is being powered off according to this embodiment will be described.

[Step S501] Whether the lens apparatus has received power-off information from the camera apparatus or not is determined. If so (YES at S501), the processing moves to step S502 in order to perform processes before the power supply shuts down.

[Step S502] The rotational position P1 of the zoom control ring 121 is detected.

[Step S503] The rotational position P1 of the zoom control ring 121 detected in step S502 is transmitted to the camera apparatus through a communication unit.

[Step S504] The lens position L1 is detected.

[Step S505] The lens position L1 detected in step S504 is transmitted to the camera apparatus through the communication unit.

[Step S506] In order to permit the camera apparatus to start a power OFF operation, power-OFF-OK information is transmitted to the camera apparatus. On the basis of the received information, the camera apparatus determines whether the power supply to the lens apparatus may be shut down or not is determined, like step S407.

Figure 3:
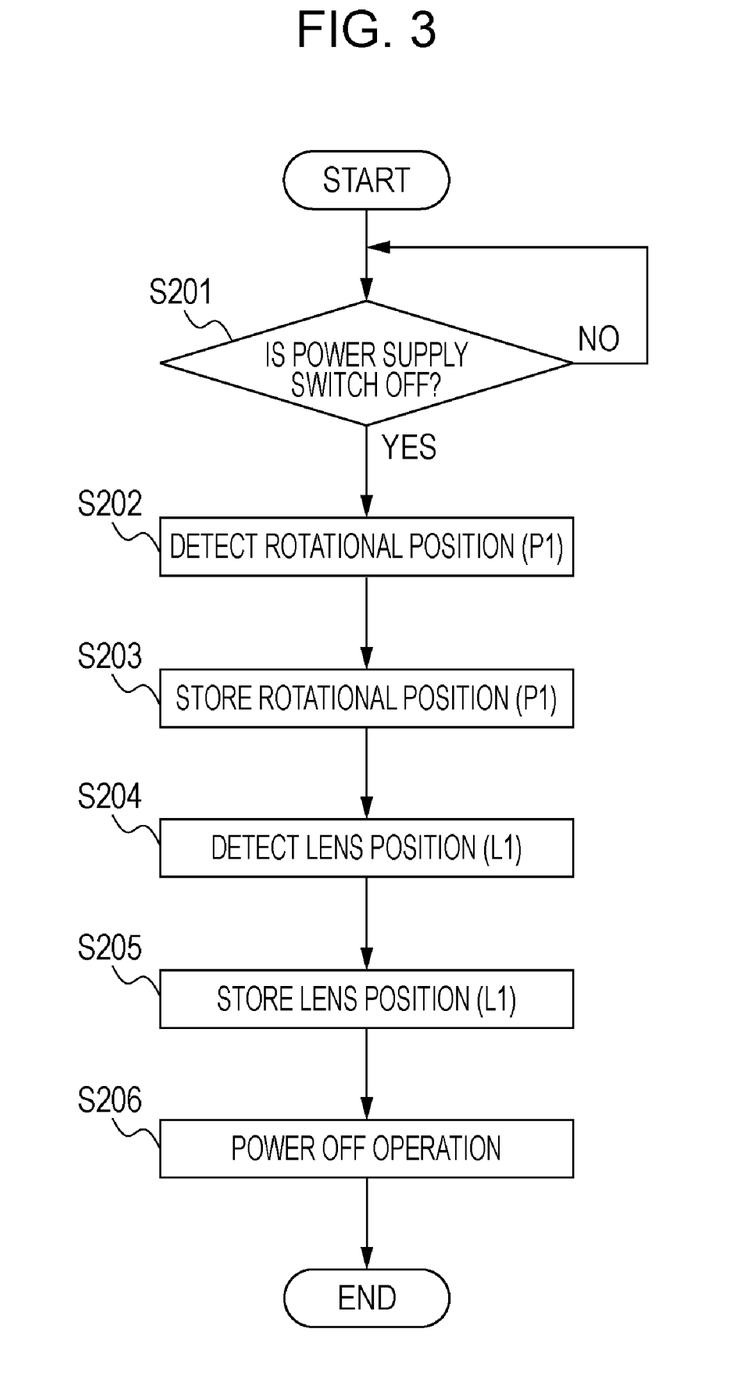
FIG. 3 is an operation flowchart when power supply is turned on according to the first embodiment.

As described above, the camera apparatus and lens apparatus perform the processing for powering off by transmitting and receiving information on the power supply switch, rotational positional information on the zoom control ring, and positional information on the lens, like the operation flow in FIG. 3 according to the first embodiment.

Figure 8:
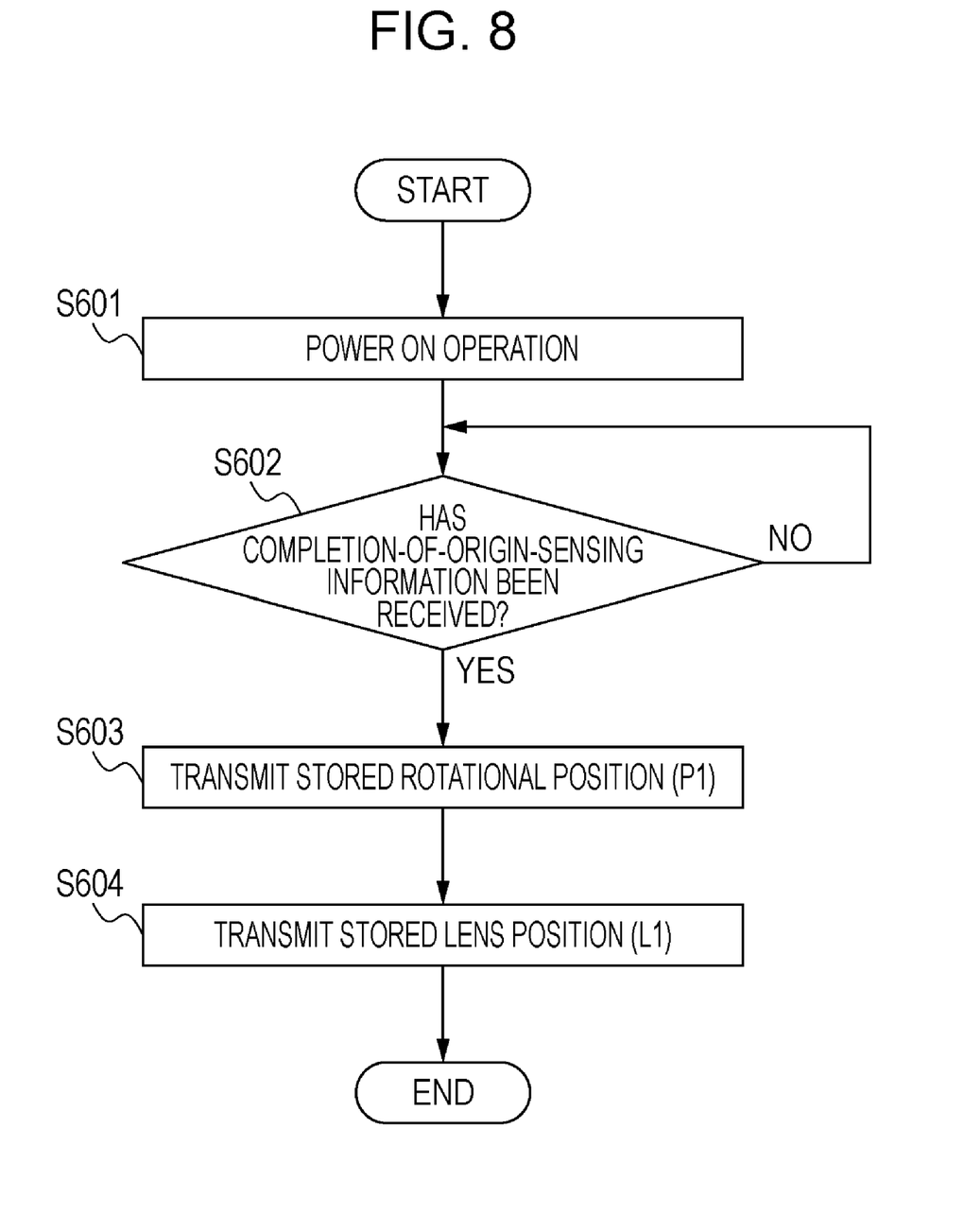
FIG. 8 is an operation flowchart when power supply to a camera apparatus is turned on according to the second embodiment.

Next, with reference to a flowchart illustrated in FIG. 8, operations of the camera apparatus when the power supply restarts according to this embodiment will be described, for example.

[Step S601] The power supply to the lens apparatus is started.

[Step S602] When the power supply to the lens apparatus is started, the lens is driven to start an operation for detecting the origin of the lens position. The camera apparatus determines on the reception of completion-of-origin-sensing information transmitted by the lens apparatus. If it is received (YES at S602), it is determined that the lens apparatus fixes the reference position for the lens position. The processing then moves to step S603. Otherwise, the camera apparatus waits (NO at S602) for the reception of completion-of-origin-sensing information transmitted by the lens apparatus.

[Step S603] The camera apparatus transmits the rotational position P1 of the zoom control ring stored upon last shut down to the lens apparatus through the communication unit.

[Step S604] The camera apparatus transmits the lens position L1 stored upon last shut down to the lens apparatus through the communication unit.

Figure 9:
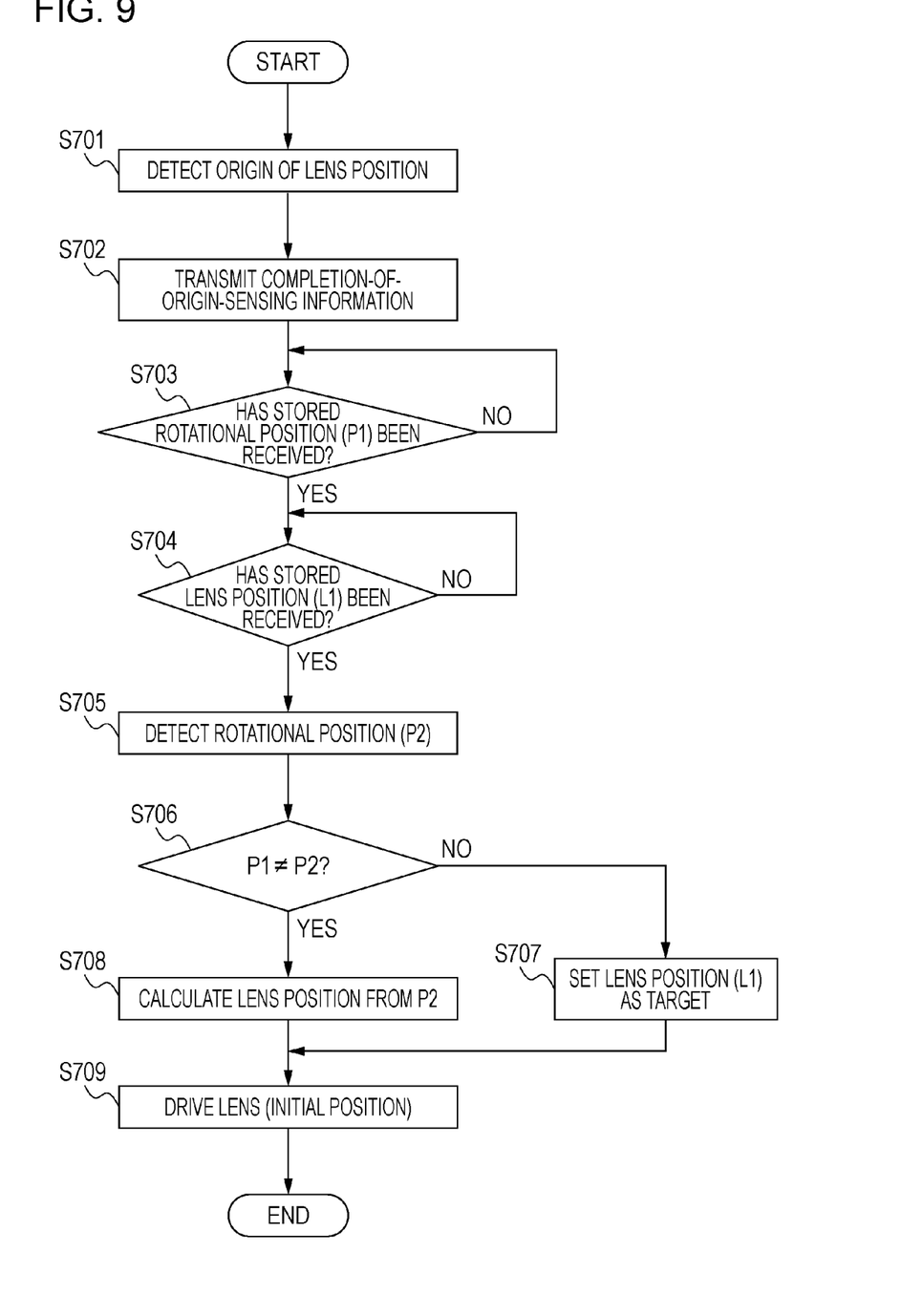
FIG. 9 is an operation flowchart when power supply to a lens apparatus is turned on according to the second embodiment.

Next, with reference to a flowchart illustrated in FIG. 9, operations of the lens apparatus when the power supply restarts according to this embodiment will be described, for example.

[Step S701] After the power supply from the camera apparatus starts, the operation for detecting the origin of the lens position is detected.

[Step S702] The information on the completion of the origin detection operation in step S701 is transmitted to the camera apparatus.

[Step S703] The rotational position P1 of the zoom control ring 121 stored upon last power shut down is received from the camera apparatus.

[Step S704] The lens position L1 stored upon last shut down is received from the camera apparatus.

[Step S705] A rotational position P2 of the zoom control ring 121 when the power supply is turned on is detected.

[Step S706] Whether the rotational position P2 when the power supply is turned on, which is detected in step S705, and the rotational position P1 stored when the power supply is turned off, which is received in step S703, are the same or not is determined. If so (NO at S706), the processing moves to step S707. If not (YES at S706), the processing moves to step S708. Though this flow determines whether the relationship is P1 ≠ P2 or not for easy description, whether the absolute value of the difference between P1 and P2 is within a predetermined error range or not may be determined in consideration of noise when the rotational position is detected or time-dependent changes.

[Step S707] If the rotational position P1 and the rotational position P2 exhibit the same value, it may be considered that the zoom control ring has not been moved during the period from the time when the power supply is turned off to the time when it is turned on. In other words, it is optimum to return the lens to the position when the power supply is turned off. Accordingly, the received stored lens position L1 is defined as a target position for lens driving.

[Step S708] If the rotational position P1 and the rotational position P2 exhibit different values, it may be considered that the zoom control ring has been moved during the period from the time when the power supply is turned off to the time when it is turned on. If the lens is returned to the lens position stored when the power supply is turned off, the one-to-one relationship between the zoom control ring and the lens position is no longer satisfied. Accordingly, if the rotational positions exhibit different values, the target lens position is calculated from the present rotational position P2 of the zoom control ring 121.

[Step S709] The lens is driven to the stored lens position L1 defined in step S707 or the position calculated in step S708.

As described above, also in an imaging system, a lens can be returned to an optimum initial position when the imaging apparatus is powered on again, and the one-to-one relationship can be kept between the rotational position of the zoom control ring 121 and the position of the zoom lens unit 101.

Having described the embodiments of an optical system of the present invention, the present invention is not limited to the embodiments but may be implemented in other configurations.

Having described, according to the aforementioned embodiment, that an operated position of an operation unit and a position of an optical member are stored in a storage unit upon powered off, the storage in a storage unit may be triggered by other operations. When a battery or AD adapter which supplies power to an optical system is unexpectedly removed, when the optical system runs out of battery or when it fails, for example, the power supply may be turned off without any storage operation. In order to solve the problem, an operated position and the position of the optical member may be stored at predetermined time intervals while power is being supplied. The predetermined time interval may be every predetermined time or every predetermined operation. More specifically, the storage operation may be repeated periodically in synchronization with a vertical frequency of NTSC or PAL, a shutter speed of photographing or the like. If the data are stored in a storage unit a plurality of number of times, one piece of the latest data may typically be stored for update, or all data may be stored every time. In any case, the latest data, that is, the data stored at the closest time to the time when the power supply terminates is preferably used after the power supply restarts.

Having described, according to the aforementioned embodiment, a zoom control ring for operating the position of the zoom lens unit, for example, the device to be operated is not limited to a zoom lens unit but may be other optical members such as a focus lens, a diaphragm and an optical filter. The form of the operation unit may not be a ring-shaped form but may only be required to move the optical member in accordance with the operated position (the amount of operation) of the operation unit.

Having described, according to the aforementioned embodiments, that the optical system is an imaging apparatus (first embodiment) having both lens unit and imaging element or an imaging system having a camera apparatus and a lens apparatus separately, the optical system may be other apparatus. For example, when the lens apparatus internally contains all components, only the lens apparatus may be handled as the optical system. The optical system may be binoculars, a telescope or a microscope instead of an imaging apparatus.

Having described, according to the aforementioned embodiment, that a driving unit (actuator 127) which drives an optical member is provided in the lens apparatus, it may be provided in the camera apparatus (camera body) and may drive an optical member within the lens apparatus through a power transmission mechanism.

According to the aforementioned embodiment, the switching unit (power supply switch 126 or power supply switch 206) is to be switched by an operator, it may be switched automatically under a predetermined condition. The predetermined condition may be out of battery, removal of a battery therefor, external impact or the like, for example.

According to the aforementioned embodiment, the detection resolution of the second sensing unit is higher than the detection resolution of the first sensing unit. However, they may have the same detection resolution, or may have the opposite relationship. The first sensing unit may be an encoder that detects positions on the basis of periodic signals instead of a potentiometer. If it is an encoder, positions may be detected by a combination of an origin sensor and an incremental type encoder or may be detected by an absolute type encoder. A potentiometer and an incremental type encoder may be used in combination. The second sensing unit may be an absolute type encoder instead of a combination of an origin sensor and an incremental type encoder.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-261130 Nov. 16, 2009, which is hereby incorporated by reference herein in its entirety.

What is claimed is:

1. An optical system comprising:
an operation unit which upon being operated changes the position of an optical member;
a first sensing unit which detects the operated position of the operation unit;
a driving unit which drives the optical member;
a second sensing unit which detects the position of the optical member;
a control unit which calculates a target position of the optical member on the basis of the operated position detected by the first sensing unit and controls the driving unit to drive the optical member to the target position such that the second sensing unit detects the position of the optical member to be the target position; and
a storage unit which stores the operated position of the operation unit and the position of the optical member before power supply to the optical system terminates, wherein:
when power supply to the optical system terminates and then the power supply restarts, the control unit compares the stored operated position and the operated position detected by the first sensing unit upon restart;
if the stored operated position and the operated position detected after the power supply restarts are different, the driving unit is controlled such that the optical member is positioned at the target position calculated on the basis of the operated position after the power supply restarts, and if the stored operated position and the operated position detected after the power supply restarts are the same, the driving unit is controlled such that the optical member is positioned at the stored position of the optical member.

2. The optical system according to claim 1, wherein:
the second sensing unit has a sensor which detects a reference position being a detection reference for the position of the optical member and a sensor which detects a relative position from the reference position; and
the control unit controls so as to drive the driving unit in the direction where the reference position is detected when the power supply restarts.

3. The optical system according to claim 1, further comprising a switching unit to be used to switch whether the power supply to the optical system is turned on or not, wherein:
if the switching unit is turned so as not to supply power, the storage unit stores the operated position and the position of the optical member.

4. The optical system according to claim 1, wherein:
the storage unit stores the operated position and the position of the optical member at predetermined time intervals, so that the latest operated position and position of the optical member is the stored operated position and the stored position of the optical member.

5. The optical system according to claim 1, wherein the detection resolution of the second sensing unit is higher than the detection resolution of the first sensing unit.

6. An optical system which has a camera body and a lens apparatus which contains an optical member and removably attached to the camera body, the system comprising:
an operation unit which operates the position of an optical member;
a first sensing unit which detects the operated position of the operation unit;

a driving unit which drives the optical member;
a second sensing unit which detects the position of the optical member;
a control unit which calculates a target position of the optical member on the basis of the operated position detected by the first sensing unit and controls the driving unit to drive the optical member to the target position such that the second sensing unit detects the position of the optical member to be the target position; and
a storage unit which stores the operated position of the operation unit and the position of the optical member before power supply to the optical system terminates; and
a communication unit that communicates information on the termination of power supply to the lens apparatus and information on the operated position immediately before the power supply to the lens apparatus terminates and the position of the optical member between the camera body and the lens apparatus, wherein:
when power supply to the lens apparatus terminates and then the power supply restarts, the control unit compares the stored operated position and the operated position detected by the first sensing unit upon restart;
if the stored operated position and the operated position detected after the power supply restarts are different, the driving unit is controlled such that the optical member is positioned at the target position calculated on the basis of the operated position after the power supply restarts,
and if the stored operated position and the operated position detected after the power supply restarts are the same, the driving unit is controlled such that the optical member is positioned at the stored position of the optical member.

7. The optical system according to claim 6, wherein:
the camera body has the storage unit; and
the communication unit transmits the stored operated position and position of the optical member to the lens apparatus when power supply to the lens apparatus terminates and the power supply then restarts.

* * * * *